United States Patent Office 3,428,084
Patented Feb. 18, 1969

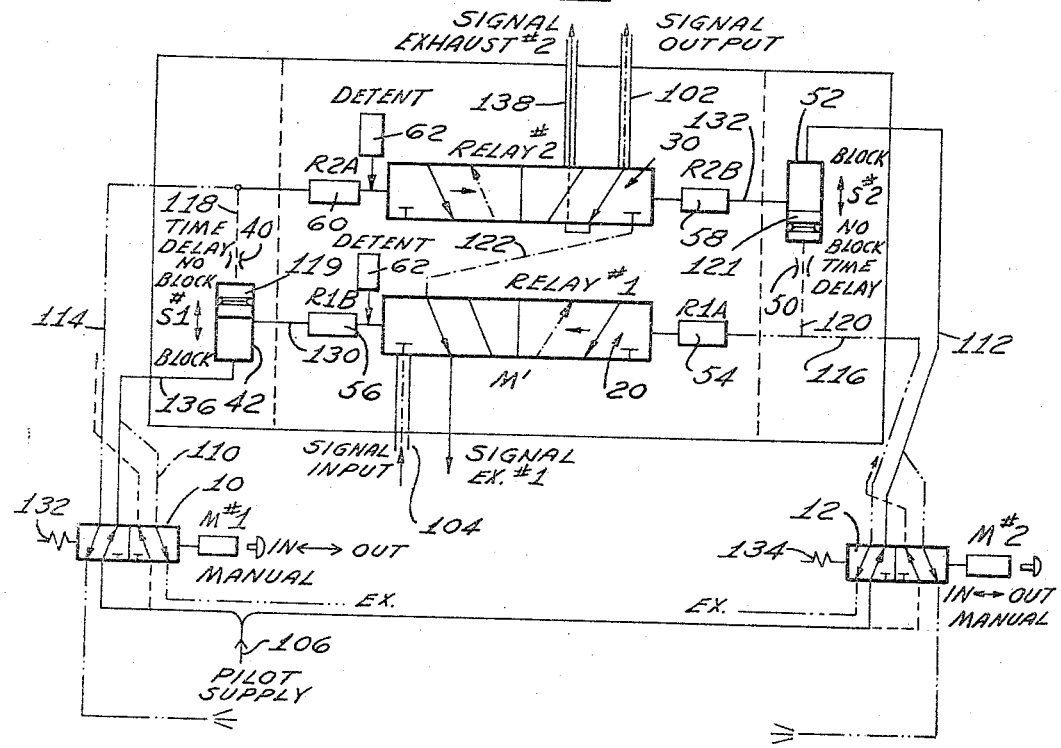

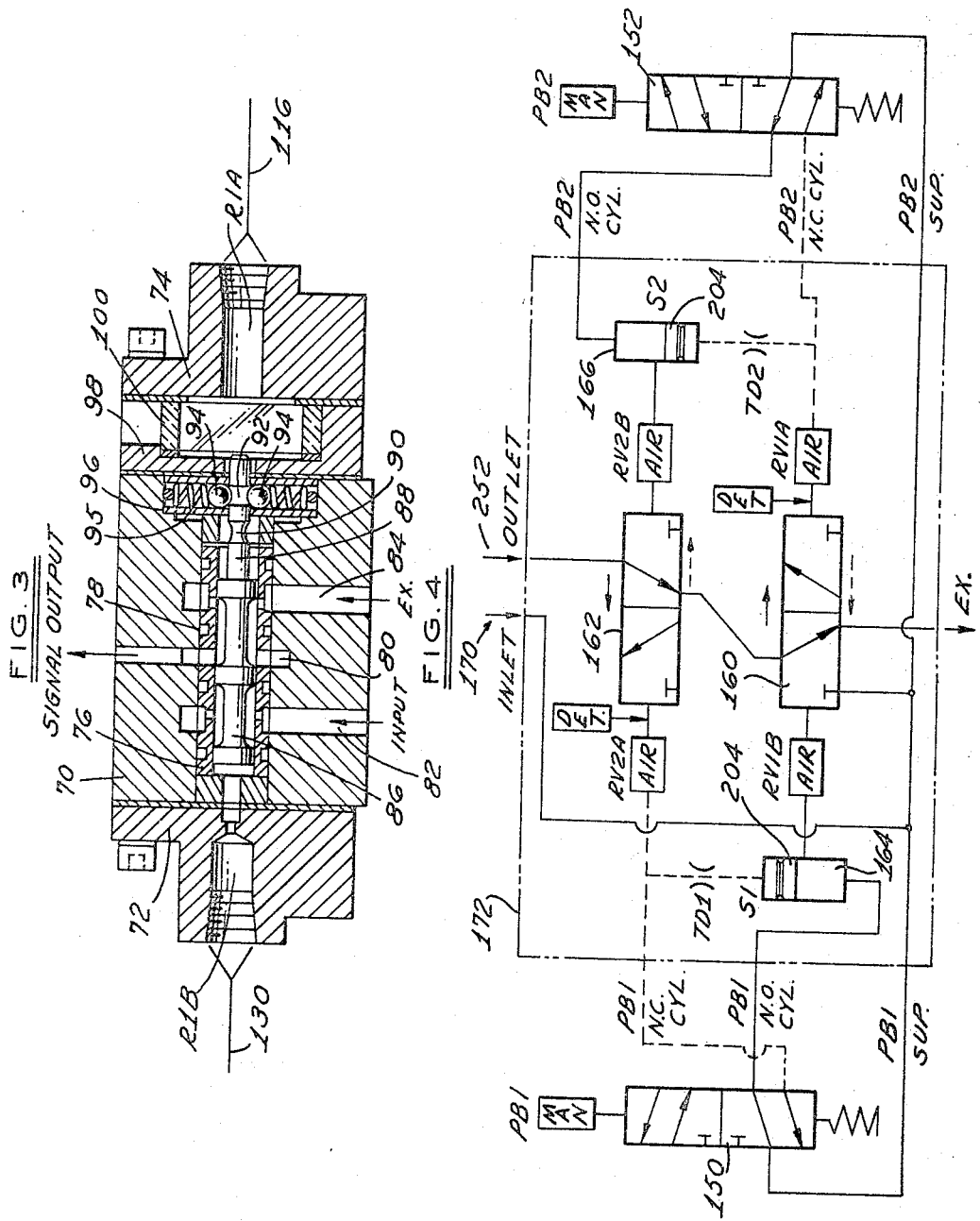

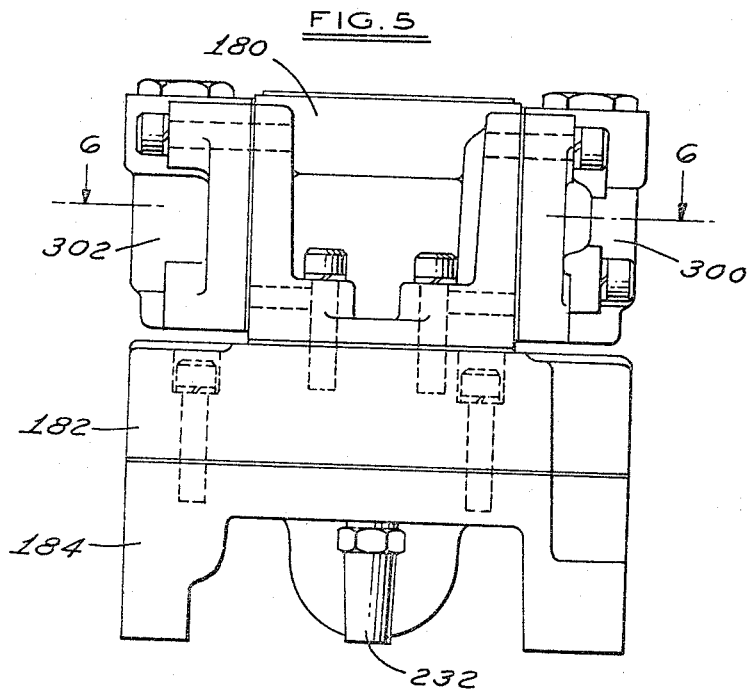
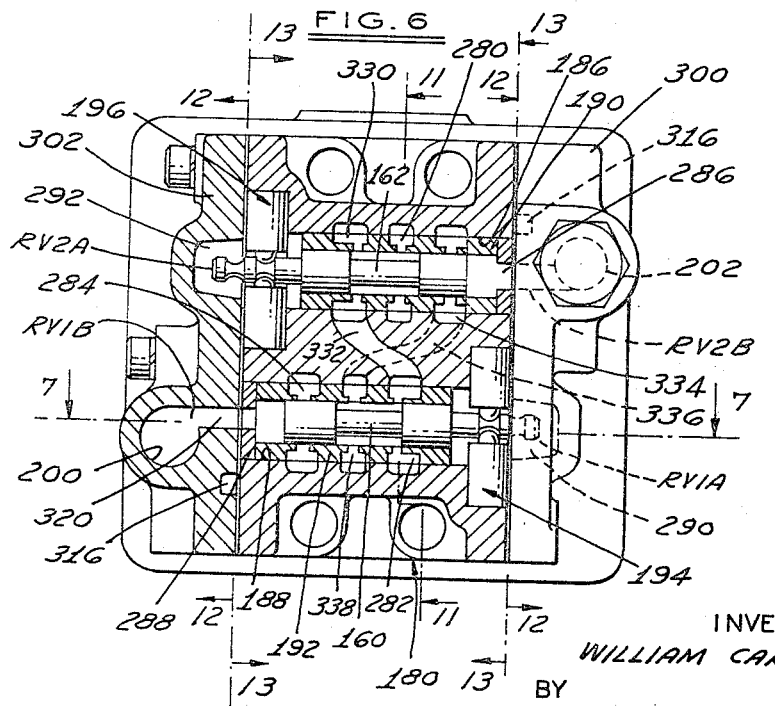

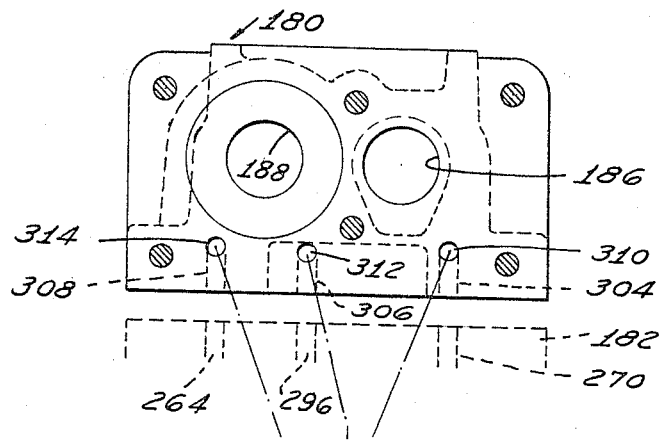
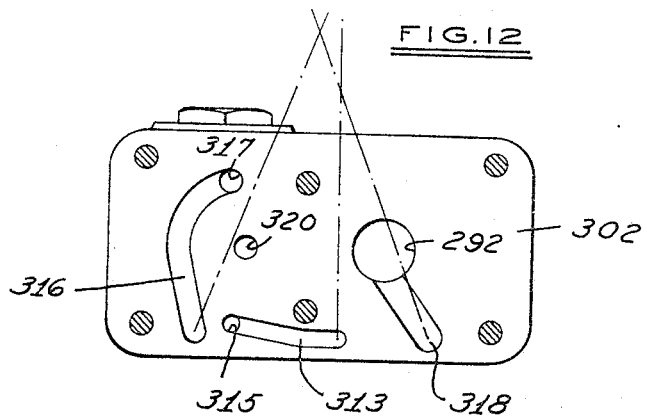

3,428,084
SAFETY VALVE SYSTEM
William Carls, Highland, Mich., assignor to Numatics, Incorporated, Highland, Mich., a corporation of Michigan
Filed Apr. 4, 1967, Ser. No. 628,472
U.S. Cl. 137—596.14
Int. Cl. F16p *3/04;* F15b *11/20*
14 Claims

ABSTRACT OF THE DISCLOSURE

A fail safe fluid control system for pressurizing an output line for actuation of a fluid motor designed to protect an operator by requiring both hands for manual operation of two spaced valves simultaneously. The system and apparatus is so designed that a delayed action of any manual valve beyond a certain predetermined time limit will block the entire action of the system and must be recycled in order to become actuated. Thus, the operator cannot depress or tie down one valve with one hand and subsequently depress the other one to obtain actuation. The system is also designed such that, in the event of power failure, the system cannot be operated, there being a single source of pressure for both the pilot control and the power control.

---

This invention relates to a safety valve system and more particularly to that type of system which is generally used in the industry to safeguard the hands of an operator of a machine who is running a machine which has what is called "exposed pinch points." These areas involve two moving parts of the machine coming together in a manner which might cause injury if the operator's hand were present. Such machines are, for example, the slide on a punch press, a clamp on a tube bending machine, or a punch on a small air press.

These systems usually utilize two manually-operated valves in the form of what is called "palm" buttons so arranged that the operator must depress and hold both buttons until the machine has reached the point where there is no danger. Operators sometimes will tie down one valve, thus negating the safety features.

It is an object of the present invention to provide a system wherein both valves must be operated each time substantially simultaneously or within a prescribed time period in order for the signal output to be effective, that is, in order for the operating pressure to reach and actuate the machine.

It is an object to provide a very simple valve system which has a completely fail safe operation and a maximum of circuit versatility.

It is a further object of the system to provide a control wherein the two manual buttons must be pressed substantially simultaneously and then both must be released in order to reset the circuit for the next operation.

It is a further object of the system to provide a control such that the operating pressure must be at a certain minimum before the system will operate, thus preventing operation under inadequate conditions.

It is a further object to provide a system which is not sensitive to the variations in pilot line lengths and sizes and a system which is independent of the rate to which the manual buttons are pressed.

Other objects and features of the invention will be apparent in the following description and claims wherein the manner of composing the circuit and the operation is described, the best mode contemplated being set out in the accompanying description and drawings.

Drawings accompany the description and claims and the various views thereof may be briefly described as:

FIGURE 1, a diagrammatic presentation using valve symbols to illustrate the operating system.

FIGURE 2, a chart showing certain relationships between the manual signal valves and the resulting valve positions.

FIGURE 3, a view of a double pilot, operating, three-way valve which can be utilized in the circuit as a relay.

FIGURE 4, a modified control circuit illustrating a composite control valve assembly.

FIGURE 5, a side elevation of a control valve assembly for the practice of the invention.

FIGURE 6, a sectional view on line 6—6 of FIGURE 5.

Figure 7:
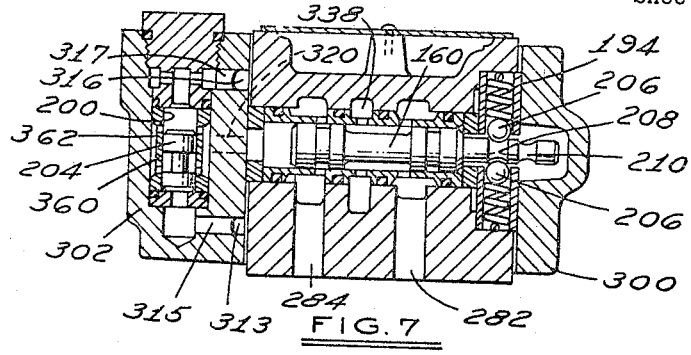

FIGURE 7, a sectional view on line 7—7 of FIGURE 6.

Figure 8:
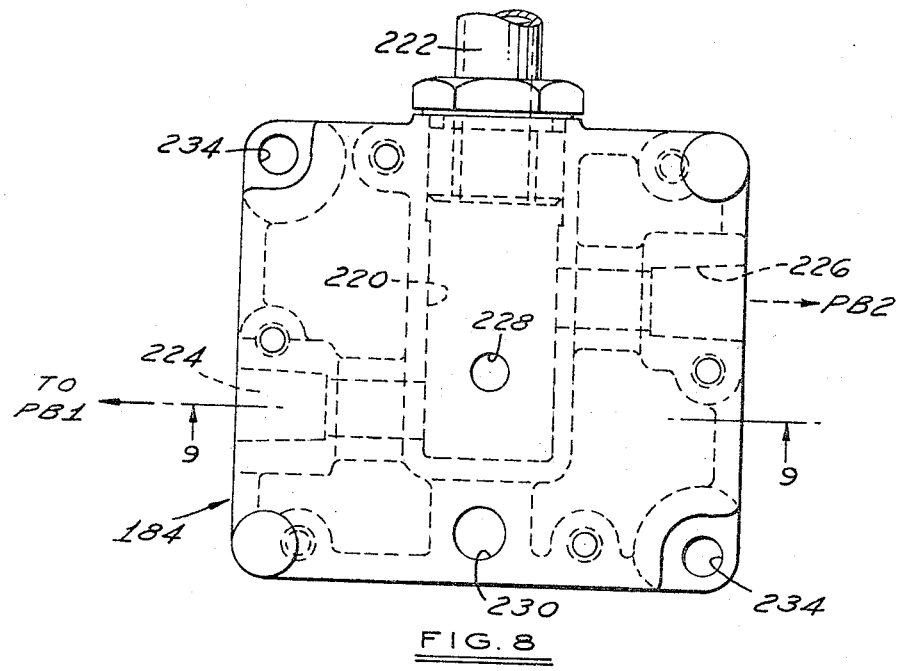

FIGURE 8, a top view of an intermediate distribution plate.

Figure 9:
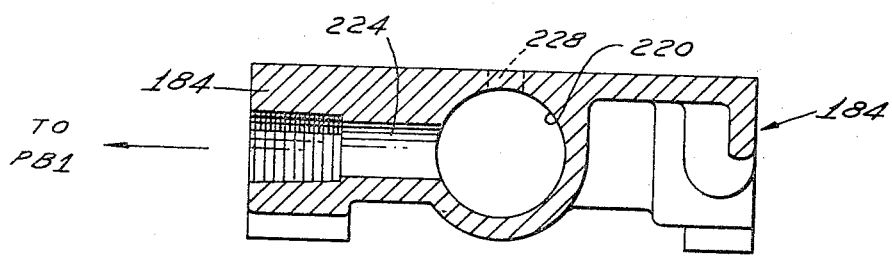

FIGURE 9, a sectional view on line 9—9 of FIGURE 8.

Figure 10:
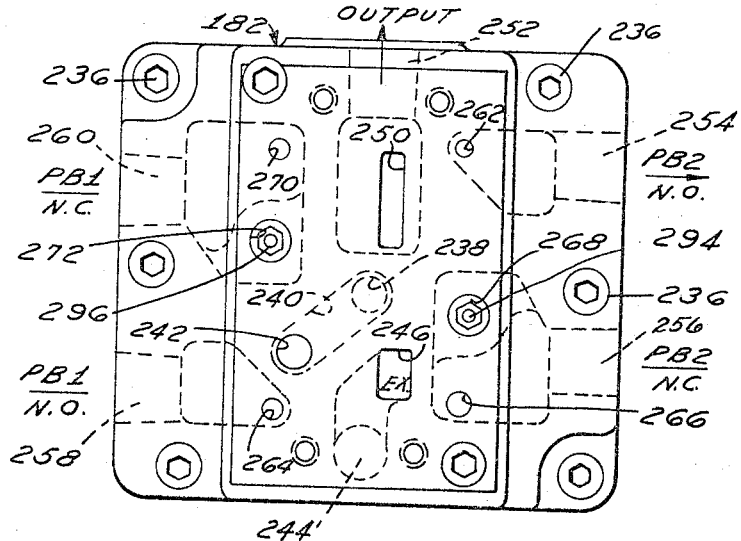

FIGURE 10, a top view of a base mounting plate.

Figure 11:
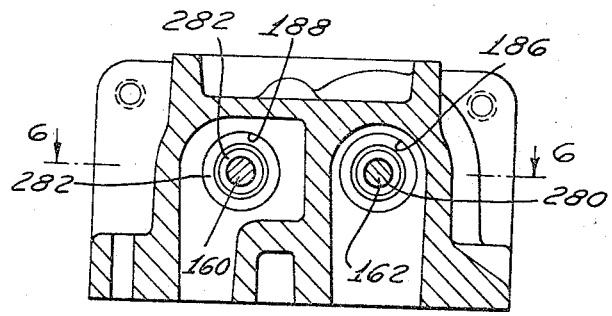

FIGURE 11, a sectional view on line 11—11 of FIGURE 6.

FIGURE 12, a sectional view on line 12—12 of FIGURE 6 of a pilot plate.

FIGURE 13, a sectional view on line 13—13 of FIGURE 6.

Referring to the drawings:

In FIGURE 1, there is shown a circuit which has a first spring return manual valve 10 and a second spring return manual valve 12, each connected in circuit with the respective ends of a first pilot-operated relay valve 20 and a second pilot-operated relay valve 30. In series with the left-hand end of valve 20 is a time-delay system comprising a double acting, i.e., dual directional, restriction or flow control 40 and a delay chamber 42. The delay chamber is a piston-cylinder combination wherein the piston shuttles from one end of the cylinder to the other exposing alternately a pilot pressure outlet line to the respective pilot pressure introduction lines at each end of the cylinder vacated by the piston. In series with the right-hand end of valve 30 is a similar time-delay system composed of a dual directional restriction 50 and a delay chamber 52. Relay valve 20 has a pilot chamber at each end designated respectively at 54 and 56 and shown also on the drawings, as R1A and R1B respectively. Relay valve 30 has a pilot chamber at each end designated 58 and 60 shown also on the drawings as R2B and R2A respectively. A detent control on each valve 20 and 30 is shown diagrammatically at 62.

In FIGURE 3, a valve construction is shown which can serve in the capacity of valves 20 and 30, this being a double acting pilot control, three-way, valve. This valve consists of an outer housing 70 with end caps 72 and 74 for receiving pilot pressure. Within the housing 70 is a sleeve 76 preferably having large clearance in the housing and being suspended in spaced relation thereto by the O-rings 78. This sleeve 76 has openings cooperating with a central port 80 and two side ports 82 and 84, there being in the sleeve a spool 86 having an extremely accurate, sliding relationship with the interior of the sleeve and adapted to have two positions one to connect ports 80 and 84 as shown, and the other to connect ports 80 and 82 in the right-hand position. The spool 86 has an extension 88 on the right-hand side with detent grooves 90 and 92 cooperating with spring-pressed detent balls 94 contained in an insertable detent ring 96. Between the end cap 74 and the housing 70 is an inserted housing 98 containing a transparent cylindrical window 100 to permit inspection of the positions of the valve. It will be evident that pressure in either end plate 72 or 74 will cause shifting of the spool valve to its respective positions.

Simultaneous action of the manual values

In the further description of the device, it is felt that a system can be best understood if the operation is described. In the first place, the object of the system is to provide a signal output at line 102 for the actuation of a fluid motor or the like, there being a signal input line at 104. Pilot supply pressure comes in at 106 leading to both manual valves 10 and 12. The manual valves have been designated on the drawing as M#1 and M#2. The system is shown with relay valve #1 in the right-hand position and relay valve #2 in the left-hand position which means that there is pilot air in chamber 56 (R1B) and pilot air in chamber 58 (R2B) of the respective valves 20 and 30. An actuation of manual valve #1 and the valve 10 will cause an exhausting through a line 110. This readies relay valve #1, indicated at 20, for movement to the left. When the manual valve #2 is actuated, that is, valve structure 12, the right-hand end of relay valve #2 at 30, namely chamber 58 and chamber 52 of the blocking cylinder, are exhausted through line 112 readying the relay valve 30 for movement to the right. Simultaneously, of course, pilot pressure from the supply 106 flows through valve 10 and line 114 to chamber 60 (R2A) and shifts the relay valve 30 to the right. From manual valve 12, pilot pressure through line 116 travels to chamber 54 (R1A) to move relay valve 20 to the left.

As pressure travels in line 114, it will be seen that it also diverts to a line 118 through a time-delay valve 40 and the piston cylinder 42 where it starts to move the piston 119 (S#1) downwardly. On the other side of the system, the pressure through line 116 also diverts to a line 120 reaching time-delay valve 50 and the piston-cylinder combination 52 where it starts to raise the piston 121 (S#2) upwardly. When both valves 10 and 12 are actuated simultaneously, the valves 20 and 30 will be shifted such that the signal input pressure 104 will pass through valve 20 to a connecting line 122 and through valve 30 to the signal output line 102. In the meantime when pistons 119 and 121 reach the end of their respective strokes, since each piston is slightly shorter than the piston travel, pressure will reach a midpoint line 130 from cylinder 42 and pass to chamber 56 (R1B), and pressure will reach a midpoint line 132 from cylinder 52 and pass to chamber 58 (R2B). This will not affect the position of valves 20 and 30 since chamber 54 (R1A) and chamber 60 (R2A) are both already pressurized. Since the valves are balanced, no movement takes place until the manual valves are released.

Non-simultaneous action of manual valves

If, for any reason, manual valve #1 is actuated and valve #2 is not actuated, the system operates to block the motion of relay valve 20 even if manual valve #2 is subsequently actuated. This occurs through the time-delay valve 40 and the cylinder 42. As described, piston 119 (S#1) is moving downwardly upon the actuation of a manual valve #1. In about .5 of a second, this piston will have reached the point where pressure from line 118 can reach a line 130 and the chamber 56 thus putting pressure on the left-hand end of valve 20; accordingly, any pressure reaching chamber 54 subsequently will not be able to move the valve. Similarly, should manual valve #2 be operated and manual valve #1 delayed, pressure can reach chamber 58 of valve 30 through a line 132 and thus block motion of valve 30 to the right even if manual valve #1 is subsequently operated. Thus, there is an effective blocking of the system and the ultimate signal output unless both valves are actuated simultaneously. The system will have to move back to reset before it can be cycled again.

Reset cycle

When manual valves #1 and #2 are released, it will be remembered that valves 10 and 12 are spring return valves as illustrated by the springs 132 and 134. Thus, the valves will return to the position as shown in FIGURE 1 where chamber 60 is exhausted through line 114 and pilot pressure is sent to the bottom of cylinder 42 through line 136, thus charging the chamber 56 (R1B) after the piston 119 (S#1) is moved upwardly to the position shown.

On the other side of the circuit, the release of manual valve #2 causes the valve 12 to exhaust chamber 54 of valve 20 and distribute pressure to the cylinder 52 to move piston 121 downwardly and pressurize chamber 58 (R2B) of relay valve 30. This will exhaust the signal output line 102 to the signal exhaust line 138 and at the same time the signal input pressure through line 104 is blocked at valve 20.

If only one of the manual valves is released, the system will not release input pressure and reset. For example, if manual valve #1 is alone released and manual valve #2 held, then R1B is pressurized and R2A is depressurized permitting pressure in R2B to actuate valve 30 (Relay valve #2) to the left. However, pressure remains in R1A and therefore pressure in R1B is ineffective to release valve 20 (Relay valve #1) to allow shifting to the reset position. Complete reset is therefore only possible if both manual valves #1 and #2 are released.

The timing of time delay systems 40–42 and 50–52 is related to the cycle time of the main system so that there is always a margin of safety.

Thus, in reset position the B end of each relay valve #1 and #2 is pressurized. In cycle for a signal output, each A end of the relay valve is immediately pressurized, and after the short delay period, the B end of each relay valve is also pressurized.

The springs 95 backing balls 94 of the detent assembly 94 (see FIGURE 3) are selected to block the motion of relay valves #1 and #2 unless the pilot pressure is at a predetermined minimum. Thus, in the absence of a proper pilot pressure supply, the system will not cycle.

It will be appreciated also that even if both manual valves are depressed simultaneously and then one of them is released even momentarily, the output will be lost and the cycle is automatically locked out. This is due to the timed pressure block in the non-operating end of each relay valve standing by to reverse the valve position upon any failure of the signal from the manual valves. Whenever this happens, both manual valves must be released before the next cycle. It will be seen also that the control circuit is completely independent of the input-output circuit and is preferably supplied with an independent pilot supply of air; thus, there is no relationship whatsoever between the control circuit and the main output circuit.

In FIGURE 2, a chart is presented showing various relationships of the position of the manual valves, the relay valves, and the result in the circuit. In condition A with both manual valves #1 and #2 out, the reset condition obtains. In condition B with simultaneous depression of both manual valves, a signal output results. In condition C with manual valve #1 in only, R#1 signal output is blocked and so on.

In addition, a sudden failure of pilot supply will leave the relay valves in the position existing at the time of failure so no injury can result, and a re-establishing of the pilot pressure will necessitate reset before operating from signal output can be effected.

In FIGURES 4 to 11, an embodiment is illustrated in which the control elements of the system are compactly arranged in a composite housing unit which contains all of the elements of the system except the manual operating valves. The circuit embodied in the control unit is illustrated diagrammatically in FIGURE 4 and is somewhat similar to the circuit of FIGURE 1 but simplified in some respects.

Two manual valves 150 and 152 are shown designated as PB1 and PB2 and two main control valve spools 160 and 162 are illustrated with the previously described detent control and the air chambers RV1A and RV1B in connection with valve 160 and the air chambers RV2A and RV2B in connection with valve 162. Delay chambers 164 and 166 designated in the circuit as S1 and S2 are shown in association with the air chambers. In this circuit, a pressure inlet 170 provides pressure source for operation of the control valves as well as the main circuit so that no separate pilot line is needed.

Taking up now the composite assembly, in FIGURES 5 to 11, there is contained in this assembly all of the units of the circuit shown in the dotted box 172 of FIGURE 4. In FIGURE 5, three components of the composite assembly include a top valve housing 180, an intermediate distribution housing 182, and a support housing 184.

As seen in FIGURE 6, which is a sectional view on line 6—6 of FIGURE 5, there are two cross bores 186 and 188 which contain respectively sleeves 190 and 192 in which are slidable the previously mentioned valves 160 and 162. Each of these valve assemblies has a center port and two side ports to control the air passage for the control outlet as will be described in connection with the operation of the system. Each of the valves is also controlled by a detent assembly shown respectively at 194 and 196 (see FIGURE 7) and at the end of each valve bore is an air chamber designated respectively as RV1A and RV1B and RV2A and RV2B. A vertical bore 200 at the left-hand end of valve 160 and 202 at the right-hand end of valve 162 houses delay piston 204 as shown in the sectional view in FIGURE 7, there being a similar piston in chamber 202.

At the right-hand end of valve 160 (FIGURE 7) is a cylindrical cartridge assembly carrying detent balls 206 for establishing valve 160 firmly in either of its two positions in cooperation with grooves 208 and 210. A similar structure is found at the left-hand end of valve 162 as shown in FIGURE 6.

Referring to FIGURES 8 and 9, the base component 184 is shown having an inlet chamber 220 fed by an inlet conduit 222 having two side ports 224 and 226 leading to PB1 air supply and PB2 air supply (FIGURE 4) respectively. In the top of the component 184 is a small port 228 which feeds component 182. An exhaust port 230 also opens at the top of the component 184 and discharges at 232 (see FIGURE 5). The component 184 has suitable mounting holes 234 at the corners.

Referring now to component 182 shown in FIGURE 10, this component is suitably fastened to base component 184 by suitable screws 236. On the bottom flat surface of component 182 is a hole 238 which registers with hole 228 in component 184 and leads to an angled passage 240 which terminates at the top surface of component 182 at 242. The exhaust passage 230 of component 184 registers with an opening 244 in the bottom of component 182 which angles to a rectangular opening 246 in the top of component 182 (FIGURE 10). Another rectangular opening 250 in the top surface of component 182 enlarges downwardly and extends to one edge of the component at an outlet 252 which is actually the output of the system which will lead to the element to be controlled.

At the four corners of the component 182 are respective outlets which terminate at the edges of the component designated 254, 256, 258 and 260. The passage 254 extends upwardly to a small surface port 262 while the passage 258 extends upwardly to a small surface port 264. Passage 256 extends upwardly to a small surface port 266 and also to a larger port 268. Passage 260 extends upwardly to a small surface port 270 and also to a larger surface port 272. These surface ports cooperate with ports in the bottom of component 180 as described below.

If reference is made to FIGURES 6 to 10, it will be seen that when the body 180 is overlayed on the body 182, port 250 in body 182 will register with a central port 280 at valve 162. Port 246 in the top surface of body 182 will register with a port 282 at valve 160. Port 242 registers with a port 284 at valve 160. Also, the small surface port 262 in body 182 opens to chamber 286 at the right-hand end of valve 162 while port 264 opens to chamber 288 at the left-hand end of valve 160 through passages to be described. Port 266 opens to the right-hand chamber 290 of valve 160 and port 270 opens to the left-hand chamber 292 of valve 162 through passages to be described.

The larger port 268 is closed by a screw plug which has a small opening 294 which serves as a restricted passage for a time delay function. Similarly, the port 272 is closed by a screw plug which has a small opening 296 which serves as a restricted passage for a time delay function.

To complete the circuit, it will be noted that the main housing 180 has two end caps 300 and 302 which are identical in shape and applied to the central housing 180 as shown in FIGURE 6 (see also FIGURE 7). FIGURES 12 and 13 show the respective surfaces of these end housings 300 and 302 as they mate with the flat end surfaces of the main valve housing 180 and it will be seen that there are three short vertical bores 304, 306 and 308 which terminate respectively at face ports 310, 312 and 314. The bore 306, for example, is directly above the small port 296 of housing 182 and the port 312 connects to a substantially horizontal surface passage 313 terminating in a port 315 leading to the bottom of the timing cylinder as shown in FIGURE 7. A similar passage feeds the timing cylinder 202 of end plate 300.

Passage 304 through the port 310 connects with the lower end of a curved surface groove 316 leading to a short passage 317 into the top of chamber 200. Passage 308, through port 314, connects to the lower end of an angled passage 318 leading to the left-hand end chamber 292 of valve 162. While adjoining surfaces between plate 302 and main valve body 180 are shown in FIGURES 12 and 13, the surfaces between plate 300 and the valve body will be identical therewith. A short passage 320 in end plate 302 connects to the chamber 288 at the left-hand end of valve 160 to the intermediate portion of the timing cylinder 200 (see FIGURE 7).

In FIGURE 11, a sectional view on line 11—11 of FIGURE 6 illustrates the shape of passages 280 and 282 previously referred to, these passages intersecting the two valve bores 186 and 188 and extending downwardly to register with the openings 250 and 246 respectively on the top of the housing 182 (see FIGURE 10).

In FIGURE 6, it will be seen that an end port 330 for valve 162 connects through a cored passage 332 to port 282. Similarly, the right-hand port 334 connects through the passage 336 to a central port 338 at valve 160. As previously described, the left-hand port 284 of valve 160 connects to the passage 242 leading through passage 240 through the port 238 and then to the pressure supply chamber 220 connected to the supply conduit 222.

As illustrated in FIGURE 7, the time delay piston 204, which appears in each of the time cylinders 200 and 202, is a double land piston mounted in a sleeve 360 which has ports adjacent each end leading to an annular area 362 around the sleeve in communication with passage 320. These ports connect the top of the piston as shown in FIGURE 7 with the central passage 320 in the position shown. If the piston is raised, it will temporarily block both of the side ports in the sleeve but will subsequently admit pressure from the bottom of the piston again to the intermediate port 320.

Referring to the operation of the system shown in FIGURES 4 to 13 and with particular reference to FIGURE 4, it will be seen that the pressure enters at the inlet 170 and divides to the two manual valves 150 and 152 where, in the spring return position of the manual valves, the pressure is permitted to reach the lower end of timing cylinder 164 and the upper end of timing cylinder 166. The pressure also goes to the valve 160.

As the valves are positioned, as shown in FIGURE 4, the two valves 160 and 162 are connecting the power motor at the point 252 to exhaust. When the manual valves PB1 and PB2 are actuated, pressure will be directed to line PB1 and PB2 of the system shown in dotted lines in FIGURE 4. This will introduce actuating air to chamber RV1A of valve 160 and chamber RV2A of valve 162, shifting both of these valves, to direct pressure to the outlet 252 and the particular power device which is receiving from that outlet. At the same time, it will be seen that pressure will be directed to the top end of delay chamber 164 and the bottom end of delay chamber 166 and after a certain time delay created by the restrictions TD1 and TD2 pressure will also reach the air chambers RV1B and RV2B of the valves 160 and 162 respectively.

Accordingly, it will be seen that if for any reason one manual valve is not depressed, the system will not operate and if there is a delay in the depressing of one manual valve subsequent to the depressing of the other, the system will not operate since the time delay safety control will take over and one of the valves 160 and 162 will be locked against motion by reason of air reaching both ends.

With reference to the actual valve structure which is utilized to accomplish the result described in connection with the schematic showing in FIGURE 4, if reference is had to FIGURES 6 to 13, as the valves are positioned in FIGURE 6, the work or outlet port 280 is connected to exhaust past valve 162, passage 332, port 282, valve 160, and ports 246, 244. It will be seen that the pressure reaches this system through the conduit 222, chamber 220, port 228, passage 240, port 242 and port 284 at valve 160. At the same time, pressure from inlet chamber 220 is present, by reason of connection through the manual valves, from ports 224 and 226 respectively in housing 184, and back through ports 254 and 258 to the top of the delay chamber piston 200 and to the top of delay chamber piston 202 and at the same time urging the valve 160 to the right and the valve 162 to the left as shown in FIGURE 6. This is what is referred to as the normally open (N.O.) condition of the system. It will be noted that the right-hand port 334 of valve 162 is connected through passage 336 and central port 338 of valve 160 to exhaust port 246 and exhaust outlet 244 in the body 182.

When both manual valves 150, 152 (FIGURE 4) are shifted simultaneously or within a predetermined fraction of time, the pressure pattern will change in FIGURE 6 to cause valve 162 to move to the right and valve 160 to move to the left. This is accomplished by directing pilot pressure from source chamber 220 through the manual valves to ports 256 and 260 in housing 182 where it passes through ports 266 and 270 respectively upward to housing 180 into passage 308 (FIGURE 13) and port 314 to end housings 300 and 302 respectively leading to passage 318 and pilot air chambers 290 and 292 at the ends of valves 160, 162. At the same time, through restricted passages 294 and 296, passage 306 and port 312 (FIGURE 13) and passage 313 and port 315 in the respective end housings 300, 302 (FIGURE 7), pressure will be directed to the bottom of the time delay cylinders 200 and 202, thus causing a piston 204 in these cylinders to shift (see FIGURE 7).

With the parts positioned as seen in FIGURE 7, the top of the chamber 200 is connected through the piston sleeve design to the port 320. When pressure reaches the bottom of the piston after a certain time period, the bottom of the chamber 200 will be connected to the port 320. This relationship is evident in the diagrammatic FIGURE 4.

Under normal circumstances then, the shifting of the valves 160 and 162 as above described, will cause pressure to pass from the said port 284 to the central port 338 and then through the passage 336 to the port 334 and past the valve 162 to the supply port 280 connected to the output passage 252. In the disclosed system, it will be appreciated that if for any reason one of the manual valves is not actuated within a certain time of the other, then time delay signals will permit actuating pilot pressure to reach both ends of a control valve and there will thus be no movement since both control valves 160 and 162 must be shifted to permit pressure from the source to reach the output 252. Also, each valve must be released after each cycle before the cycle can be repeated. For example, if valve 150 of FIGURE 4 is actuated to relieve pressure at RV1B and to direct pressure to RV2A, and valve 152 is not actuated, there will then be pressure at both ends of valve 162 and it will not move. In addition, pressure will again reach RV1B after time delay piston 204 has stroked so that later, if valve 152 is actuated, pressure at RV1A cannot shift valve 160. Both manual valves must be released for a predetermined time before the system can again be cycled.

It will thus be seen that in a very compact valve structure, the pilot operated control valves each related to a time delay system provide positive protection against accidental output pressure when both manual valves are not depressed by the operator, the valves being spaced so that both hands must be used to actuate the system. As previously pointed out, the time delay restrictions TD1 and TD2 of FIGURE 4 find their counterpart in the system in the restrictions 294 and 296 in plugs that close the ports 268 and 272 in the top of housing 182. The detent systems for each valve 194 and 196 are provided to establish positive positions of the valve in each extreme movement.

What is claimed as new is as follows:

1. A fail safe fluid control system for pressurizing an output line for the actuation of a fluid motor and the like which comprises:
   (a) a source of actuating pressure,
   (b) an output line,
   (c) a plurality of pilot-operated relay valves in series in said output line, each of said valves having pilot actuation chamber at each end and being movable selectively to a flow, no-flow position,
   (d) a plurality of manual pilot valves for directing a source of pilot pressure directly to ends of said respective relay valves to actuate said relay valves selectively to flow or no-flow positions, and
   (e) a time-delay system to direct pilot pressure after a predetermined time delay to the ends of said relay valves not directly supplied by said pilot valves to prevent movement to a flow position when said valves are not both actuated within a prescribed time period.

2. A system as defined in claim 1 in which said time-delay system comprises an automatic reset piston-cylinder combination having a pressure introduction line adjacent each end of the cylinder and an intermediate pilot pressure outlet line spaced from each end of said cylinder whereby said piston may shuttle from one end of said cylinder to the other and open said pilot pressure outlet line at the extremity of each stroke to the pressure introduction line of the vacated end.

3. A system as defined in claim 2 in which the manual pilot valves direct pressure simultaneously to said relay valves and said time-delay system to pressurize both ends of said relay valves subsequent to a pilot shifting thereof and after a predetermined time lapse.

4. A fail safe fluid control system for pressurizing an output line for the actuation of a fluid motor and the like which comprises:
   (a) a source of actuating pressure,
   (b) an output line,
   (c) a plurality of pilot operated relay valves in series in said output line, each of said valves being shiftable by pilot pressure selectively to a flow, no-flow position, and
   (d) manual pilot valves operable to direct pilot pressure respectively directly, each to one of said relay valves, to urge each to a flow position and to direct pilot pressure to the other of said relay valves in a time-delay circuit to pneumatically bias said valve to a no-flow position, whereby both said pilot valves must be operated substantially simultaneously to connect said source of actuating pressure to said output line.

5. A system as defined in claim 4 in which each said time-delay circuit comprises an automatic reset piston-cylinder combination having a pressure introduction line adjacent each end of the cylinder and an intermediate pilot pressure outlet line spaced from each end of said cylinder whereby said piston may shuttle from one end of said cylinder to the other and open said pilot pressure outlet line at the extremity of each stroke to the pressure introduction line of the vacated end.

6. A system as defined in claim 4 in which each said time-delay circuit comprises an automatic reset shuttle piston and a cylinder for said piston in a housing having a two-way passage at each end connected to a manual valve, one of said passages being restricted to limit flow at a predetermined rate, and having a two-way passage intermediate said ends leading to a pilot valve, said shuttle piston serving in a shuttle stroke caused by pressure in one of said end passages to block flow momentarily from said intermediate passage and subsequently to connect the pressurized two-way end passage to said intermediate passage.

7. A system as defined in claim 4 in which each of said relay valves has a pilot pressure chamber at each end to shift the relay valve away from the pressurized pilot chamber, and said manual pilot valves are connected to direct control pressure respectively to one end of one of said relay valves to move each to a flow position, and said time-delay circuit serving to direct pressure from said pilot valves to the other ends of said relay valves after a predetermined time lapse.

8. A fail safe fluid control system for pressurizing an output line for the actuation of a fluid motor and the like which comprises:
 (a) a source of actuating pressure,
 (b) an output line,
 (c) a plurality of pilot-operated relay valves in series in said output line, each of said valves having pilot actuation chamber at each end and being movable selectively to a flow, no-flow position,
 (d) a plurality of manual pilot valves for directing a source of pilot pressure directly to a pilot actuation chamber at one end of each of said relay valves to urge said relay valves to a flow position, and to direct pressure to the said pilot actuation chambers at the other end of said respective relay valves, and
 (e) a time-delay means interposed to delay for a predetermined time actuation pressure reaching said other ends of said relay valves, whereby non-simultaneous actuation of said manual pilot valves will cause a blocking of at least one of said relay valves from movement to a flow position.

9. A control valve assembly for a fail safe fluid control system for pressurizing an output line for the actuation of a fluid motor and the like which comprises:
 (a) a base having a pressure chamber for receiving fluid under pressure with outlets for distributing pressure to an output line and to pilot control valves, said base having four two-way passages to connect to said pilot control valves,
 (b) a housing on said base,
 (c) a pair of pilot operated slidable spool valves in said housing in series in said output line to control pressure to said output line,
 (d) a pilot chamber at each end of each of said valves in said housing to receive pilot pressure to urge said valves away from the chamber receiving the pressure,
 (e) passages in said base and in said housing to connect each said pilot chambers respectively with two of said two-way passages, and
 (f) a pair of shuttle pistons mounted in cylinders on said housing connected to said pilot chambers movable selectively to block each of said pilot chambers from one of said two-way passages, said shuttle pistons each in one position connecting one of said two-way passages to pilot chambers at one end of each of said pilot operated valves.

10. A control valve assembly for a fail safe fluid control system for pressurizing an output line for the actuation of a fluid motor and the like which comprises:
 (a) a base having a pressure chamber for receiving fluid under pressure with outlets for distributing pressure to an output line and to pilot control valves, said base having four two-way passages to connect to said pilot control valves,
 (b) a housing on said base,
 (c) a pair of pilot operated slidable spool valves in said housing in series in said output line to control pressure to said ouput line,
 (d) a pilot chamber at each end of each of said valves in said housing to receive pilot pressure to urge said valves away from the chamber receiving the pressure,
 (e) passages in said base and in said housing connecting each of two of said two-way passages respectively directly to a pilot chamber at one end of a pilot operated valve,
 (f) passages including a fluid time-delay means in said base and in said housing connecting the other two of said two-way passages respectively to a pilot chamber at the other end of said pilot-operated valves, and
 (g) a by-pass connection including said time-delay means between said passages to connect pilot chambers of said respective pilot operated valves to block motion of at least one thereof in the absence of simultaneous actuation to prevent flow in an output line.

11. A control valve assembly as defined in claim 10 in which said fluid time-delay means each comprises a cylinder and a shuttle piston therein serving as a valve to connect each end of said cylinder selectively dependent on the position of the piston to said other ends of said pilot operated valves.

12. A control valve assembly as defined in claim 11 in which said cylinders are mounted in an end plate on said housing and are independently removable without disturbing the connections between said housing and said base.

13. A control valve assembly as defined in claim 12 in which said passages to the respective ends of said cylinders in said end plates and to the one end of said respective pilot operated valves comprises passages in said housing leading upward and outward to an outer face and mating surface passages in the end plate face adjacent the housing.

14. A control valve assembly as defined in claim 13 in which the motion of the shuttle piston is controlled in the cylinder by a restricted inlet-outlet port comprising a screw plug in the top of the base having a restricted opening therein registrable with a passage in the base of the housing leading to an end plate.

References Cited

UNITED STATES PATENTS

| | | | |
|---|---|---|---|
| 2,974,637 | 3/1961 | Holmes et al. | 137—596.14 |
| 2,986,121 | 5/1961 | Nowack | 91—424 |
| 3,170,484 | 2/1965 | Benz et al. | 91—424 XR |

HENRY T. KLINKSIEK, *Primary Examiner.*

U.S. Cl. X.R.

91—424